United States Patent
Meric et al.

(10) Patent No.: US 6,966,063 B1
(45) Date of Patent: Nov. 15, 2005

(54) IEEE SET TOP BOX DEVICE DRIVER

(75) Inventors: Jérôme Meric, Senlis (FR); Christophe Declerck, Senantes (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/489,676

(22) Filed: Jan. 24, 2000

Related U.S. Application Data

(63) Continuation of application No. PCT/IB98/01172, filed on Jul. 23, 1998.

(30) Foreign Application Priority Data

Jul. 24, 1997 (EP) ................................ 97401793

(51) Int. Cl.$^7$ ............................................... G06F 3/00
(52) U.S. Cl. ...................... 719/321; 719/322; 725/131; 725/134; 725/142
(58) Field of Search ................................ 719/321, 322, 719/323, 324, 328; 718/1; 709/224, 253; 725/37, 86, 131, 134, 139, 142, 151; 710/305, 710/8

(56) References Cited

U.S. PATENT DOCUMENTS

| | | | | |
|---|---|---|---|---|
| 5,608,730 A | * | 3/1997 | Osakabe et al. | 370/471 |
| 5,787,259 A | * | 7/1998 | Haroun et al. | 709/253 |
| 5,815,675 A | * | 9/1998 | Steele et al. | 710/305 |
| 5,815,678 A | * | 9/1998 | Hoffman et al. | 710/305 |
| 5,883,621 A | * | 3/1999 | Iwamura | 725/37 |
| 6,219,703 B1 | * | 4/2001 | Nguyen et al. | 709/224 |
| 6,286,054 B2 | * | 9/2001 | Wang | 719/321 |
| 6,393,496 B1 | * | 5/2002 | Schwaderer et al. | 719/328 |

FOREIGN PATENT DOCUMENTS

| | | |
|---|---|---|
| WO | WO 98/43172 | 10/1998 |
| WO | WO/ 98/43433 | 10/1998 |

OTHER PUBLICATIONS

Copy of International Search Report from PCT Appl. No. PCT/IB98/01172, completed Aug. 31, 1998, 1 page.

S. Hartwig, "Softwarearchitekturen Fuer Interaktive Digitale Decorder," Fernesh und Kinotechnik, vol. 50, No. 3, Mar. 1, 1996, pp. 92-94.

Wickelgren, I., "The Facts Anout FireWire," IEEE Spectrum, vol. 34, No. 4, Apr. 1997, pp. 19-25.

* cited by examiner

*Primary Examiner*—St. John Courtenay, III
*Assistant Examiner*—Van H. Nguyen
(74) *Attorney, Agent, or Firm*—Osha Liang LLP

(57) ABSTRACT

A device interface for use in a receiver/decoder for a broadcast digital television system in which received signals are passed through a receiver to the receiver/decoder and then to a television set. The receiver/decoder decodes a compressed MPEG-type signal, and is controlled by a remote controller handset, through an interface in the receiver/decoder. The operation of the receiver/decoder is controlled by a virtual machine (VM) which includes a run time engine (RTE). The receiver/decoder includes a plurality of interfaces to external units. The device interface enables an application run by the RTE to access an IEEE 1394 interface.

40 Claims, 5 Drawing Sheets

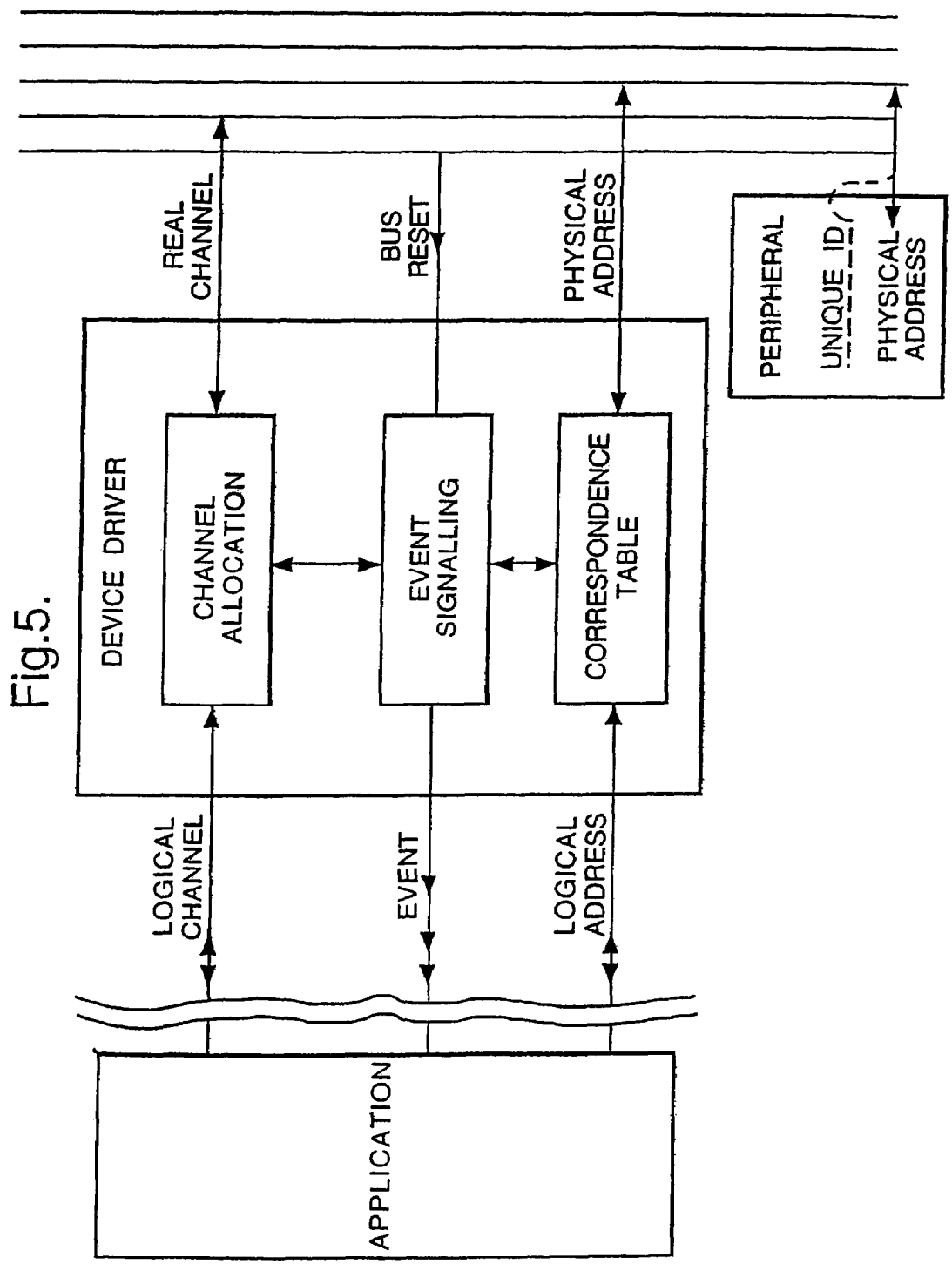

IEEE SET TOP BOX DEVICE DRIVER

This is a continuation of Application No. PCT/IB98/01172, filed Jul. 23, 1998.

BACKGROUND OF THE INVENTION

1. Field of the Invention

The present invention relates to interfacing of application programs to physical devices (peripherals), particularly but not exclusively in the context of receiver/decoders for digital television systems.

2. Description of Related Art

The advent of digital transmission systems has opened up the possibility of using such systems for other purposes. One of these is to provide interactivity with the end user. As used herein, the term "digital transmission system" includes any transmission system for transmitting or broadcasting for example primarily audiovisual or multimedia digital data. Whilst the present invention is particularly applicable to a broadcast digital television system, the invention may also be applicable to a fixed telecommunications network for multimedia internet applications, to a closed circuit television, and so on. As used herein, the term "digital television system" includes for example any satellite, terrestrial, cable and other system.

The present invention finds specific application in a broadcast digital television system in which received signals are passed through a receiver to a receiver/decoder and thence to a television set. The term "receiver/decoder" used herein may connote a receiver for receiving either encoded or non-encoded signals, for example, television and/or radio signals, which may be broadcast or transmitted by some other means. The term may also connote a decoder for decoding received signals. Embodiments of such receiver/decoders may include a decoder integral with the receiver for decoding the received signals, for example, in a "set-top box", such a decoder functioning, in combination with a physically separate receiver, or such a decoder including additional functions, such as a web browser, a video recorder, or a television.

The receiver/decoder decodes a compressed MPEG-type signal into a television signal for the television set. It is controlled by a remote controller handset, through an interface in the receiver/decoder, also known as a set-top box or STB. The term MPEG refers to the data transmission standards developed by the International Standards Organisation working group "Motion Pictures Expert Group" and in particular but not exclusively the MPEG-2 standard developed for digital television applications and set out in the documents ISO 13818-1, ISO 13818-2, ISO 13818-3 and ISO 13818-4. In the context of the present patent application, the term includes all variants, modifications or developments of MPEG formats applicable to the field of digital data transmission.

One way of providing the interactivity described above is to run an application on the receiver/decoder through which the television signal is received. It is desirable to enable a variety of applications to communicate with a variety of physical devices in a transparent manner. Our co-pending applications PCT/EP97/02115 and PCT/EP97/02116 describe systems in which one or more applications can be downloaded by a receiver/decoder and communicate with physical devices in the receiver/decoder such as parallel and serial interfaces and smartcard readers by means of a driver for each device and an overall device manager. As used herein, the term "smartcard" includes, but not exclusively so, any chip-based card device, or object of similar function and performance, possessing, for example, microprocessor and/or memory storage. Included in this term are devices having alternative physical forms to a card, for example key-shaped devices such as are often used in TV decoder systems.

BRIEF SUMMARY OF THE INVENTION

Pursuant to the present invention, it has been proposed to provide the capability for a receiver/decoder to communicate with other audio-visual equipment, for example, a digital video recorder over a high-speed digital interface. The recently developed IEEE 1394 standard provides a promising and flexible interface protocol, providing serial communication rates of 100 Mbit/s or more.

A problem with using the IEEE 1394 interface is that the interface bus may be reset or the parameters altered by a device connected to the bus other than the receiver/decoder and this may cause problems for an application. This may lead to a requirement for greater memory and processing power to run more complex applications capable of dealing with the interface. This would add both to the cost of each receiver/decoder and also to the cost of developing and debugging applications.

Aspects of the invention attempt to alleviate the problems of interfacing applications to such interfaces. Although the invention offers most advantages in interfacing a receiver/decoder to an IEEE 1394 or the like interface, it will be appreciated that the invention can be applied to interfacing other applications to interfaces whose parameters may change outside the control of the application.

In a first aspect, the invention provides a method of communicating data, via a device driver, between an application and an interface having at least one feature to which an interface identifier is assigned, the interface identifier being liable to change after at least one event, the method comprising for at least one said feature, storing a corresponding logical identifier, providing the logical identifier to the application for directing communication associated with the corresponding feature between the device driver and the application, and maintaining correspondence between the logical identifier and the feature independently of the interface identifier assigned to the feature so that communication between the application and the device driver directed using a given logical identifier remains associated with the corresponding given feature following a change in the assignment of the corresponding interface identifier to the feature.

In this way, although the association of interface identifiers and features may change from time to time, such changes can be made substantially transparent to the application, which can consequently be simpler.

Communication between the interface and the device driver is preferably directed based on the interface identifier; this facilitates communication with the interface.

Local identifiers may be assigned only to features which are specified by one or more applications. This may reduce the number of logical identifiers required.

Alternatively, the device driver may be arranged to compile a list of logical identifiers and corresponding interface identifiers for all said features, or for all features meeting pre-determined criteria, and preferably to update this list each time a feature is added or removed or altered, or if any interface identifier is changed.

Although the method removes the need for the application to know the interface identifier, preferably the device driver is arranged to communicate the interface identifier assigned to a logical identifier to the application on request. This is found to facilitate testing of a system remarkably, as it is possible for a high-level application to determine whether the interface and associated device driver is functioning as desired.

Preferably, the device driver is arranged to accept requests from an application to define connections between physical devices connected to the bus using at least one logical identifier in place of an interface identifier. This may facilitate management of connections by an application.

The application is preferably arranged to communicate with the device driver via device manager means. Provision of device manager means allows overall control of communication to be effected, so that multiple applications may communicate with multiple devices without conflict.

In a first preferred implementation, at least one said feature of the interface comprises a peripheral connected to the interface and the corresponding interface identifier comprises the physical address (also sometimes known as a node address) assigned to that peripheral, the logical identifier comprising a logical address (which may also be termed a logical peripheral identifier) assigned to the peripheral. Thus, an application, using a given logical address can continue to communicate with a given peripheral (for example a digital video recorder), even if the physical address of the peripheral changes (for example following connection of another peripheral to the bus and subsequent bus reset).

In such a case, maintaining correspondence preferably includes interrogating each peripheral to which a logical address is assigned to determine the physical address assigned to the peripheral following the event, for example a bus reset. This enables the assignments to be updated following any likely change in physical address.

Also in such a case, it is particularly advantageous if communicating the interface identifier for a given peripheral comprises communicating the physical (or node) address of the peripheral and also includes communicating a further identifier of the peripheral, for example a unique node identifier containing further information identifying the peripheral. The unique node identifier may identify the manufacturer and/or vendor and/or model number of the peripheral, and may include a serial number. The unique node identifier is preferably at least 4 bytes, and more preferably 8 bytes long.

According to a second preferred implementation, at least one said feature of the interface comprises a channel of defined parameters available via the interface and the corresponding interface identifier comprises the interface channel number (or so-called channel Identifier), the logical identifier comprising a logical channel identifier. In this way, it is not necessary for the application to keep track of interface channel numbers, which may change. The channels are preferably isochronous channels having a defined bandwidth.

Preferably the device driver is arranged to receive a request from an application to allocate a channel of defined parameters (for example a channel having a defined maximum bandwidth) and to return a logical channel identifier if allocation is successful. Although the application need not know the interface channel number, it is preferable if the device driver is arranged to accept a preferred interface channel number and to allocate the preferred interface channel if available, and to allocate a free channel if the preferred interface channel is not available or if no preferred interface channel is specified. Provision of the ability to specify interface channels may facilitate control and testing of the interface by a suitable application, without requiring all applications to recognise interface channel numbers. Preferably the device driver is arranged to receive an identifier of a preferred interface channel, and to recognise a pre-determined key in place of a valid interface channel number as specifying no preferred channel and to report an error to the application if other invalid interface channel numbers are specified; this may assist in debugging applications.

It is also preferable that the device driver is arranged to communicate the interface channel identifier to the application, and preferably also other parameters, preferably including at least one of the maximum rate allocated to the channel, the rate currently available, the number of connections (if any) using the channel, and the identifiers of each connection using the channel. This enables sophisticated management of communications by a suitable application, without requiring all applications to deal with such parameters to use the interface.

Most preferably, the first and second preferred implementations are both employed together, the device driver being arranged to accept requests from an application to define one or more connections between peripherals attached to the interface by reference to logical addresses and logical channel identifiers. Combination of the two implementations in this way provides the synergistic benefit that an application is able to establish connections without needing to keep track of any details of the physical address of the peripherals concerned or the interface channel over which the connection is established. Preferably, the device driver is arranged to establish at least one of point-to-point connections between specific peripherals and broadcast connections.

During an event, such as a bus reset, in which interface parameters are liable to change, communication may be interrupted. Although the device driver may handle certain events without requiring input from the application, it is preferable that the device driver is arranged to signal one or more events to an application (if the application so requests), the events preferably including at least one of reset of the bus (preferably separate events signalling beginning and end of reset), a change in bus topology or channel or connection parameters.

In a second aspect, the invention provides a device driver for effecting communication between an application and an interface having at least one feature to which an interface identifier is assigned, the interface identifier being liable to change after at least one event, the device driver comprising means for storing at least one logical identifier corresponding to a respective interface identifier, means for providing the logical identifier to the application for directing communication associated with the corresponding feature between the device driver and the application, and means for maintaining correspondence between the logical identifier and the feature independently of the interface identifier assigned to the feature so that communication between the application and the device driver directed using a given logical identifier can remain associated with the corresponding given feature following a change in the assignment of the corresponding interface identifier to the feature.

The device driver may be implemented in hardware, for example in a dedicated integrated circuit; this may provide enhanced speed of operation. More preferably, however, the device driver is implemented at least partly in software, preferably run by processing means which runs the application; this allows greater flexibility, requires less components, and allows the device driver to be updated more readily.

In a third aspect, the invention provides a data processing system comprising run-time engine means for running an application, interface means for connection to at least one device, the interface having at least one feature to which an interface identifier is assigned, the interface identifier being liable to change after at least one event, and device driver means comprising means for storing at least one logical identifier to corresponding to a respective interface identifier, means for providing the logical identifier to the application for directing communication associated with the corresponding feature between the device driver and the application, and means for maintaining correspondence between the logical identifier and the feature independently of the interface identifier assigned to the feature so that Communication between the application and the device driver directed using a given logical identifier can remain associated with the corresponding given feature following a change in the assignment of the corresponding interface identifier to the feature. Preferred features of the first aspect may be applied to the second and third aspects.

The data processing system is preferably implemented in a receiver/decoder (for example a set-top box) which includes means for receiving broadcast data (via satellite or cable), the interface preferably being arranged for connection to a digital video recorder or digital display device or computer for display or storage of at least a portion of the received data. The device driver means is preferably arranged to cooperate with device means for modifying the received data stream to produce a modified data stream for passing to said interface.

The interface preferably conforms to the IEEE 1394 standard or a modification, refinement or variation thereof. Data may be transported according to the IEEE 1883 standard.

The application is preferably run in an interpreted language and the device driver is preferably compiled.

The invention is most preferably employed in a receiver/decoder for enabling an application to communicate with, for example, a digital video recorder over an IEEE 1394 bus. The device driver may be arranged to transmit commands for controlling the digital video recorder from the application and/or to receive data concerning the information stored on the digital video recorder; in this way an interactive application running in the receiver/decoder may control recording and playback of programs or other data. The data to be communicated is preferably MPEG format (by which is meant any variant or development of the basic MPEG format) data, but other formats may be used.

BRIEF DESCRIPTION OF THE FIGURES

Preferred features of the present invention will now be described, purely by way of example, with to the accompanying drawings, in which:—

FIG. 5 is a schematic diagram illustrating some components of the device driver.

DETAILED DESCRIPTION OF THE INVENTION

Receiver/Decoder Basics

Before describing a device driver embodying the invention, the basic features of the preferred platform, a digital satellite receiver/decoder, will be explained briefly.

Figure 1:
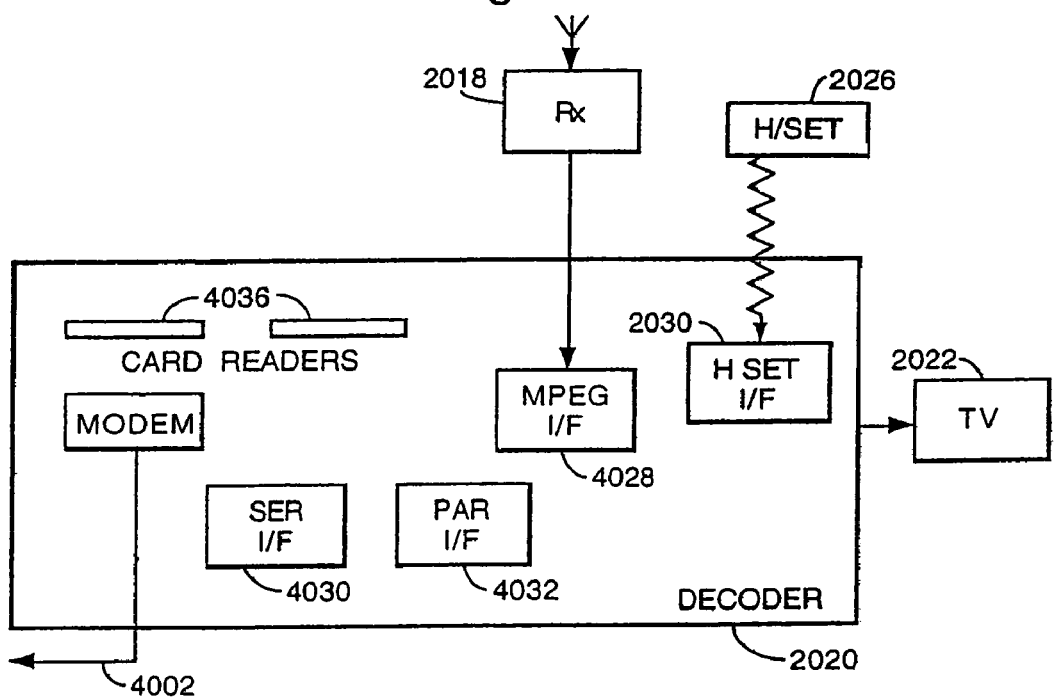
FIG. 1 is a schematic diagram of interfaces of a receiver/decoder.

Referring to FIG. 1, a receiver/decoder 2020 or set-top box for use in a digital interactive television system in which the device driver of the embodiment is intended to be installed is schematically depicted. Details of a suitable digital interactive television system may be found in our co-pending applications PCT/EP97/02106–02117 to which reference should be made, and the disclosures of which are herein incorporated by reference. For ease of reference, parts described in more detail in the aforementioned specifications are generally designated by the reference numerals used in those specifications. The basic arrangement of the receiver/decoder will be summarised below, to assist in understanding the function of the device driver.

As described in more detail in the aforementioned specifications, referring to FIG. 1, the receiver/decoder 2020 includes several interfaces; specifically, a tuner 4028 for the MPEG signal flow, a serial interface 4030, a parallel interface 4032, and two card readers 4036, one for a smartcard forming part of the system and one for bank cards or other smart cards (used for making payments, home banking, etc). The receiver/decoder also includes an interface 4034 to a modemmed back channel 4002 to the television signal producer, so that the user can indicate preferences, etc back to the television signal (programme) producer. The receiver also comprises a Run-Time-Engine 4008, a Device Manager 4068 and a plurality of Devices 4062 for running one or more applications 4056.

For the purposes of this specification, an application is a piece of computer code for controlling high level functions of preferably the receiver/decoder 2020. For example, when the end user positions the focus of a remote controller on a button object seen on the screen of the television set 2022 and presses a validation key, the instruction sequence associated with the button is run.

An interactive application proposes menus and executes commands at the request of the end user and provides data related to the purpose of the application. Applications may be either resident applications, that is, stored in the ROM (or FLASH or other non-volatile memory) of the receiver/decoder 2020, or broadcast and downloaded into the RAM or FLASH memory of the receiver/decoder 2020.

Some examples of applications, described in more detail in the aforementioned applications are:—

An Initiating Application which is an adaptable collection of modules enabling the receiver/decoder 2020 to be immediately operative in the MPEG-2 environment.

A Startup Application which allows any application, either downloaded or resident, to run on the receiver/decoder 2020.

A Program Guide which is an interactive application which gives full information about programming.

A Pay Per View application which is an interactive service available on each PPV channel of the digital TV bouquet to enable the end user to buy the current event.

A PC Download application enabling an end user to download computer software using the PC download application.

A Magazine Browser application comprising a cyclic video broadcast of images with end user navigation via on-screen buttons.

A Teleshopping application enabling offers of goods for sale to be transmitted to the receiver/decoder 2020 and displayed on the television 2022 and enabling the user to select a particular item to buy.

Applications are stored in memory locations in the receiver/decoder 2020 and represented as resource files. The resource files comprise graphic object description unit files, variables block unit files, instruction sequence files, application files and data files, as described in more detail in the above mentioned specifications.

In the MPEG data stream, each module comprises a group of MPEG tables. Each MPEG table may be formatted as a number of sections. In the MPEG data stream, each section has a "size" of up to 4 kbytes. For data transfer via the serial and parallel port, for example, modules similarly are split into tables and sections, the size of the section varying with the transport medium.

Modules are transported in the MPEG data stream in the form of data packets of typically 188 bytes within respective types of data stream, for example, video data streams, audio data streams and teletext data streams. Each packet is preceded by a Packet Identifier (PID) of 13 bits, one PID for every packet transported in the MPEG data stream. A programme map table (PMT table) contains a list of the different data streams and defines the contents of each data stream according to the respective PID. A PID may alert a device to the presence of applications in the data stream, the PID being identified using the PMT table.

The decoder contains memory divided into a RAM volume, a FLASH volume and a ROM volume, but this physical organization is distinct from the logical organization. The memory may further be divided into memory volumes associated with the various interfaces. From one point of view, the memory can be regarded as part of the hardware; from another point of view, the memory can be regarded as supporting or containing the whole of the system shown apart from the hardware.

The system can be regarded as centred on a run time engine 4008 forming part of a virtual machine 4007. This is coupled to applications on one side (the "high level" side), and, on the other side (the "low level" side), via various intermediate logical units discussed below, to the receiver/decoder hardware 4061. The receiver/decoder hardware can be regarded as including the various ports or interfaces as discussed above (the interface 2030 for the handset 2026, the MPEG stream interface 4028, the serial interface 4030, the parallel interface 4032, the interfaces to the card readers 4036, and the interface 4034 to the modemmed back channel 4002).

Figure 2:
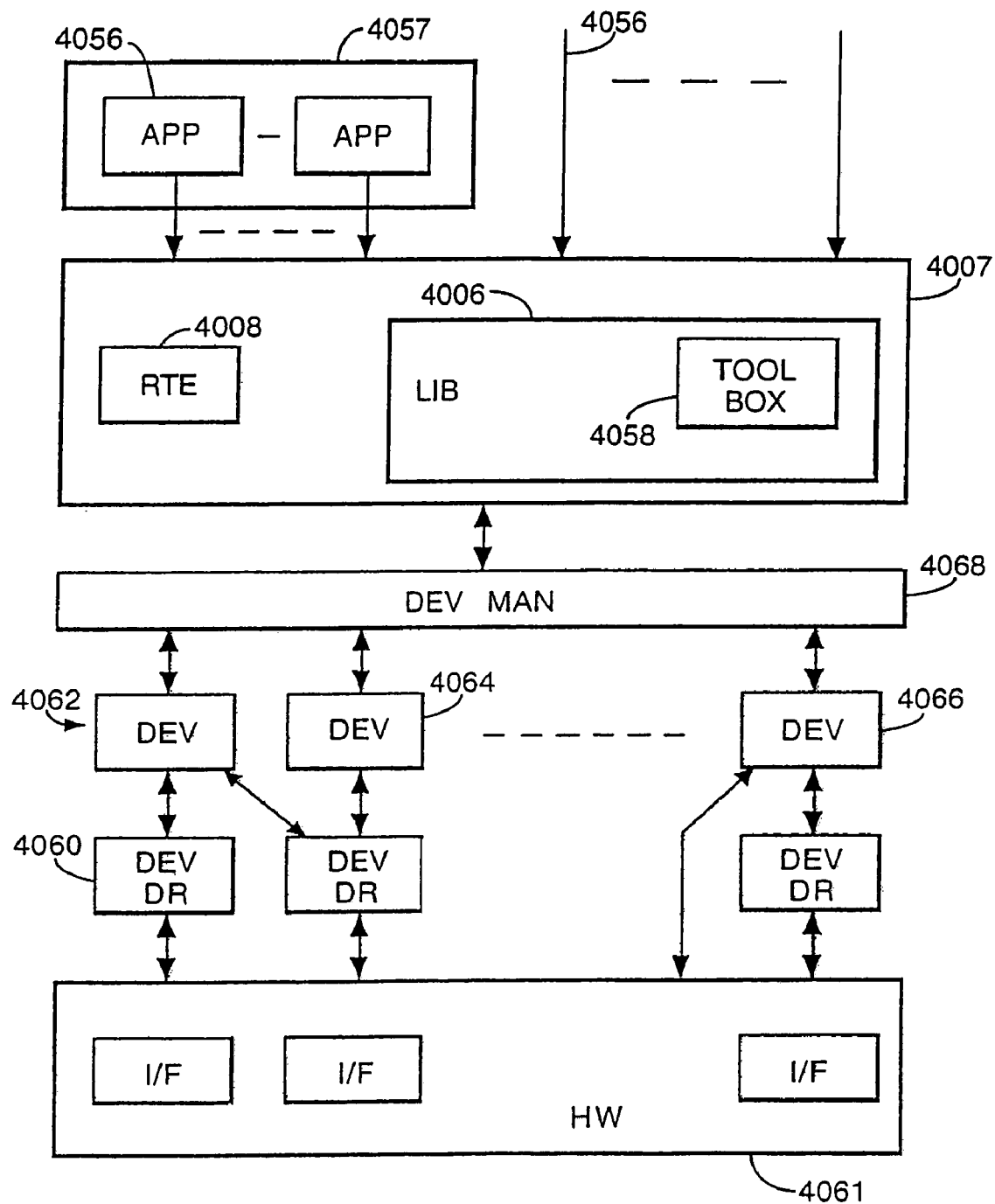
FIG. 2 is a functional block diagram of the receiver/decoder.

With reference to FIG. 2, various applications 4056 are coupled to the unit 4007; some of the more commonly used applications may be more or less permanently resident in the system, as indicated at 4057, while others will be downloaded into the system, eg from the MPEG data stream or from other ports as required.

The unit 4007 includes, in addition to the run time engine 4008, some resident library functions 4006 which include a toolbox 4058. The library contains miscellaneous functions in C language used by the engine 4008. These include data manipulation such as compression, expansion or comparison of data structures, line drawing, etc. The library 4006 also includes information about hardware 4061 in the receiver/decoder 2020, such as hardware and software version numbers and available RAM space, and a function used when downloading a new device 4062. Functions can be downloaded into the library, being stored in Flash or RAM memory.

The run time engine 4008 is coupled to a device manager 4068 which is coupled to a set of devices 4062 which are coupled to device drivers 4060 which are in turn coupled to the ports or interfaces. In broad terms, a device driver can be regarded as defining a logical interface, so that two different device drivers may be coupled to a common physical port. A device will normally be coupled to more than one device driver; if a device is coupled to a single device driver, the device will normally be designed to incorporate the full functionality required for communication, so that the need for a separate device driver is obviated. Certain devices may communicate among themselves.

As will be described below, there are 3 forms of communication from the devices 4062 up to the run time engine: by means of variables, buffers, and events which are passed to a set of event queues.

Each function of the receiver/decoder 2020 is represented as a device 4062. Devices can be either local or remote. Local devices 4064 include smartcards, SCART connector signals, modems, serial and parallel interfaces, a MPEG video and audio player and an MPEG section and table extractor. Remote devices 4066, executed in a remote location, differ from local devices in that a port and procedure must be defined by the system authority or designer, rather than by a device and device driver provided and designed by the receiver/decoder manufacturer.

When a new device 4062 is created, it can be installed in existing receiver/decoders 2020 by downloading the relevant application 4056 from the broadcast centre. This downloading is performed in the receiver/decoder 2020 by an application 4056 which checks the hardware and software versions and, if correct, loads the software module representing the new device 4062 and asks a procedure of the library 4006 to install the new device code within the firmware (in Flash memory). This can provide a flexible and secure installation of new functions within the receiver/decoder 2020 without affecting the rest of the software.

The device manager 4068 is a common software interface between the application 4056 and the specific functions of the receiver/decoder 2020. The device manager 4068 controls access to devices 4062, declares receipt of an unexpected event, and manages shared memory.

The run time engine 4008 runs under the control of the microprocessor and a common application programming interface. They are installed in every receiver/decoder 2020 so that all receiver/decoders 2020 are identical from the application point of view.

The engine 4008 runs applications 4056 on the receiver/decoder 2020. It executes interactive applications 4056 and receives events from outside the receiver/decoder 2020, displays graphics and text, calls devices for services and uses functions of the library 4006 connected to the engine 4008 for specific computation.

The run time engine 4008 is an executable code installed in each receiver/decoder 2020, and includes an interpreter for interpreting and running applications. The engine 4008 is adaptable to any operating system, including a single task operating system (such as MS-DOS). The engine 4008 is based on process sequencer units (which take various events such as a key press, to carry out various actions), and contains its own scheduler to manage event queues from the different hardware interfaces. It also handles the display of graphics and text. A process sequencer unit comprises a set of action-groups. Each event causes the process sequencer unit to move from its current action group to another action-group in dependence on the character of the event, and to execute the actions of the new action-group.

The engine 4008 comprises a code loader to load and download applications 4056 into the receiver/decoder memory 2028. Only the necessary code is loaded into the RAM or Flash memory, in order to ensure optimal use. The downloaded data is verified by an authentication mechanism to prevent any modification of an application 4056 or the execution of any unauthorized application. The engine 4008 further comprises a decompressor. As the application code (a form of intermediate code) is compressed for space saving and fast downloading from the MPEG-2 transport stream or via a built-in receiver/decoder mode, the code must be decompressed before loading it into the RAM. The engine 4008 also comprises an interpreter to interpret the application code to update various variable values and determine status changes, and an error checker.

Before using the services of any device 4062, a program (such as an application instruction sequence) has to be declared as a "client", that is, a logical access-way to the device 4062 or the device manager 4068. The manager gives the client a client number which is referred to in all accesses to the device. A device 4062 can have several clients, the number of clients for each device 4062 being specified depending on the type of device 4062. A client is introduced to the device 4062 by a procedure "Device__Open Channel". This procedure assigns a client number to the client. A client can be taken out of the device manager 4068 client list by a procedure "Device__Close Channel".

The access to devices 4062 provided by the device manager 4068 can be either synchronous or asynchronous. For synchronous access, a procedure "Device: Call" is used. This is a means of accessing data which is immediately available or a functionality which does not involve waiting for the desired response. For asynchronous access, a procedure "Device: I/O" is used. This is a means of accessing data which involves waiting for a response, for example scanning tuner frequencies to find a multiplex or getting back a table from the MPEG stream. When the requested result is available, an event is put in the queue of the engine to signal its arrival. A further procedure "Device: Event" provides a means of managing unexpected events.

As noted above, the main loop of the run time engine is coupled to a variety of process sequencer units, and when the main loop encounters an appropriate event, control is temporarily transferred to one of the process sequencer units.

Figure 3:
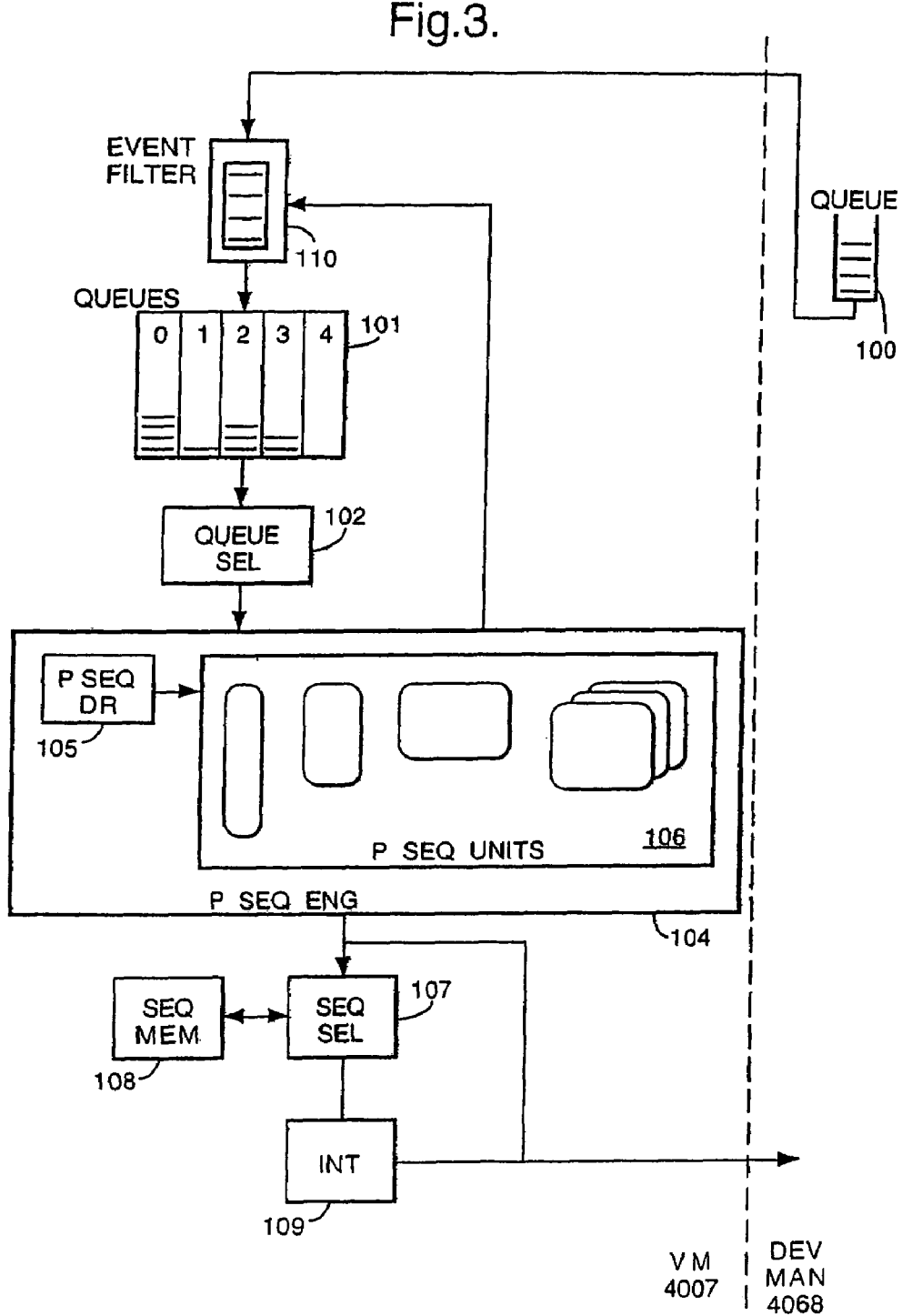
FIG. 3 shows certain components of the virtual machine and run time engine in more detail.

Referring to FIG. 3, the device manager includes a queue 100 into which events from the devices are passed for temporary storage. At suitable intervals, the virtual machine sends a signal to this queue to extract the first item from it. This event item is moved to a queue structure 101 in the virtual machine. Depending on the priority level of the event item, it is inserted into the appropriate one of the 5 queues 0 to 4. Event items are extracted from the queue structure 101 by a queue selector unit 102 under the control of the run time engine.

When an event is selected from the queue structure 101, it is passed to a process sequencer unit engine 104, which consists of a process sequencer unit driver 105 and a set of process sequencer units 106. Each process sequencer unit is a set of action-groups linked together, so that each step from one action-group to the next action-group is, in general, dependent on the current action-group and the nature of the event. Different process sequencer units have different sizes and complexities, including one in which the "next" action-group, ie the action-group to which the system steps on in response to an event, is dependent solely on the nature of the event but is independent of the current action-group. Also, as is shown at the right-hand side of the process sequencer units block, there may be several copies of a process sequencer unit, ie several identical process sequencer units, to deal eg with several separate data streams using identical protocols through a single port.

When an event is selected, it is passed to the appropriate process sequencer unit. This selects the appropriate outlet from the current action-group on the process sequencer unit. This results in the appropriate next action-group being selected and the actions in that action-group being performed, involving eg the sending of a message to the device manager or the execution of a instruction sequence. Action-groups in the process sequencer unit can also send event messages to other process sequencer units.

If an instruction sequence is selected, the identification of the instruction sequence is sent to a instruction sequence selector 107. This obtains the desired instruction sequence memory 108 and passes it to a instruction sequence interpreter 109, which executes the instruction sequence.

The system also includes a filter 110, which is loaded with event types eg from the process sequencer units 106. When an event item is passed from the queue 100 in the device manager to the queue structure 101 in the virtual machine, its type or character is matched against the list in the filter 110, and if it is of a type which is not recognized, it is rejected. This ensures that if say the device manager or the keyboard generates events of a type which the virtual machine cannot deal with, those events are not passed to the queue structure 101. (If events of this kind were passed to the queue structure 101, either they would accumulate in that queue structure or they might cause malfunctioning of the process sequencer unit engine 104.)

Thus, it can be seen that our basic receiver/decoder platform provides considerable flexibility in enabling an application to communicate with a variety of devices.

Device Driver for IEEE 1394 Bus

Figure 4:
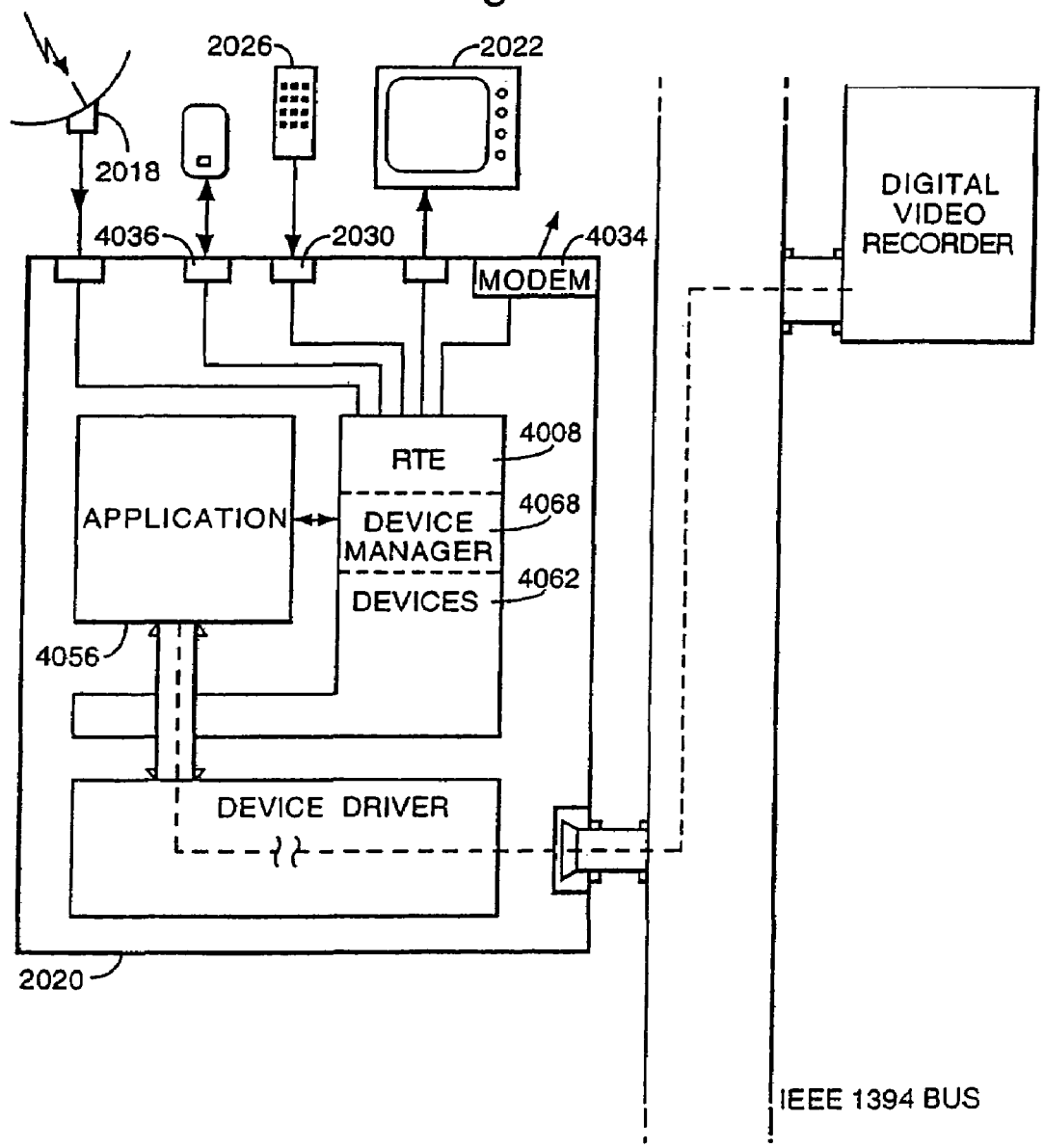
FIG. 4 is a schematic diagram for explaining the flow of communication between an application and a remote peripheral via the device driver.

Referring to FIG. 4, it can be seen that the IEEE 1394 bus driver operates according to the above described scheme to facilitate communication between an application and a peripheral such a digital video recorder connected to the IEEE 1394 bus.

For high speed communication of data, for example for storage of MPEG real-time data, conventional serial and parallel interfaces, which are relatively straightforward to control by an application, may not be fast enough. The device driver described below incorporates a number of novel features which enable an application to access the IEEE 1394 bus efficiently, and may enable control of, for example, a digital video recorder connected to the bus by a relatively unsophisticated application.

The device driver can be considered as comprising a number of functional units which are separately accessible by an application, hereinafter termed commands. Each command interfaces with an application via a device 4062 run under the control of the device manager 4068 by means of one of the three standard procedures mentioned above, which are common to other devices. Information may be passed between an application and the device driver by means of parameter tables. For ease of reference, the three basic procedures are summarised briefly below:—

1) Device: Call. This command can be used by an application for performing synchronous commands or data transfer. Execution of the application is suspended until control is returned when the operation by the device driver has completed; this allows operations which must be performed in strict sequence to be controlled reliably.

2) Device: I/O. This command allows asynchronous operation. That is, an application can send a request for a data transfer or a particular function to be performed by the device driver and execution of the application can continue while the data transfer or function is performed by the device driver.

3) Device: Event. This event trapping function enables events to be signalled by the device driver to an application, and for particular action to be taken by the application in response to the event independently of the code the application is executing at the time the event is signalled; effectively the application is interrupted. Events may be prioritised. Events may be used to signal events occurring, on the interface, such as a bus reset.

The commands provided in a device driver embodying the invention will now be described. Each command may be accessed by an application by passing an identifier of the command as a parameter via either the Device: Call or Device: IO problems. Not all of the commands described below need be provided, and the functions of the commands may be altered. Although the commands may be independently provided or altered, as will be appreciated, certain synergistic benefits accrue from the combined functionality provided by the commands described.

The commands will be described in terms of the features and functions provided by each command, as seen by an application, together with optional and preferable features. With the information given and specifications provided, actual implementation of these features should be straightforward for one skilled in the art, and the precise details are left to the implementor. As an example, each command could be implemented in software, preferably written in the C programming language and preferably compiled to run on the processor used to run the application; however the device driver may be run on a separate processor, and some or all commands may be implemented by dedicated hardware. Using the Call or IO commands, the device driver may signal information or pass parameters back to an application by setting values in a parameter table stored in memory whose address is passed to the device driver.

It will be appreciated that the functionality described below for the commands implies certain underlying functions to be implemented by the device driver, for example, to deal with logical peripheral identifiers and logical channel identifiers, the device driver incorporates means for maintaining respective tables of logical peripheral identifiers and logical channel identifiers enabling them to be correlated to their corresponding interface features (physical address or channel number respectively). In addition, in the event of an occurrence such as a bus reset, the device driver is arranged to ascertain the new physical addresses and channel numbers and to update the tables so that transition is relatively seamless as seen by an application.

In addition, of course, the device driver includes means for actually effecting communication with the interface and for performing necessary housekeeping tasks such as memory allocation and de-allocation. Some of these functions are schematically illustrated in FIG. 5. The details of these will depend on the specific physical hardware used, but will be straightforward for one skilled in the art to implement based on the guidance presented in this specification, and with reference to the appropriate portions of the IEEE 1394 standards documentation (the disclosure of which is herein incorporated by reference), so will not be described here.

Command: Bus 1394 Set

This command enables basic interface parameters to be set by an application, preferably the size of a data reception buffer that should be allocated and the number of communication retries to be used when sending asynchronous commands via the interface. The parameters could be pre-set and the command omitted, but provision of this command enables communications to be optimised for different applications. Although such parameters could very well be set asynchronously, it is found preferable to access this command via the Call method, so that subsequent application commands are only executed after the device parameters have been stabilised. The command preferably signals an error to the application if the device driver is in the process of receiving data from a peripheral.

Command: Bus 1394 Info

This command returns basic information concerning bus topology to an application. Because it is less time-critical, it is preferably accessed asynchronously via the IO command.

Preferably, this and indeed all or at least some asynchronous commands are arranged to pass a maximum time (for example in ms) required for response (or a code, for example zero signifying no maximum time); this may enable the device driver to prioritise requests.

Preferably the command returns information concerning the maximum data rate managed by the bus, the data rate available at the moment of the call (that is, taking into account connections already active on the bus), the number of peripherals physically connected to the bus and their corresponding logical identifiers (to be discussed further below), and which logical channels are available at the time of the call.

With the IEEE 1394 bus, each peripheral connected to the bus is assigned a physical address which may change from time to time.

It will be appreciated that, although specific provision of this command is optional, it is desirable that the device driver maintains a table of logical addresses (also termed logical peripheral identifiers) which are constant for each peripheral (for a given session for a given application; the logical addresses may change if the receiver/decoder is re-set), so that on each execution, an application can use a single logical address to identify a corresponding peripheral uniquely and unambiguously. The channel numbers assigned to channels may also vary, so the device driver also maintains a table of logical channel numbers. The device driver may then respond to an information request simply by looking up data from the appropriate table.

Preferably, information concerning the availability of channels is passed in binary form, as a bitmap, preferably 8 bytes of information in which each bit encodes the availability of one of 64 logical channels (for example a "0" signifying that the channel is already allocated and a "1" signifying that the channel is available for use).

Command: Bus 1394 Info Periph

This command is arranged to receive a parameter indicating a logical peripheral identifier and to return a two-byte physical address (also known as a node ID) corresponding to the physical address assigned to the peripheral on the interface, and preferably also to return an 8 byte unique node identifier preferably uniquely identifying the peripheral globally, or at least identifying the vendor or model number of the peripheral. This provides the capability for a suitably sophisticated application to determine, for example, special capabilities of the equipment based on information identifying specific peripherals.

The command is preferably arranged to signal an error if the interface is not physically Connected to a functional IEEE 1394 bus or if the logical peripheral identifier is invalid (for example greater than a predetermined maximum, preferably 63), and also to signal a pending bus reset, an error if the specified logical peripheral identifier is not known, or if the device fails to respond within a specified time.

The command is preferably accessed asynchronously, by means of the Device: I/O procedure, a signal indicating completion or failure being passed by means of a parameter block.

Command: Bus 1394 Alloc Channel

This command is arranged to receive a request to allocate a channel, preferably specifying the desired communication rate and preferably also the desired interface channel to be used. A pre-determined code (for example 0FFh) may be used to signify that no particular interface channel, in which case, or in the case of the desired interface channel being occupied, the device driver allocates an available channel.

The command returns an allocated logical channel identifier if successful, and preferable signals an error in the applicable cases described above for the Bus_1394_Info_Periph command, or if no channels are available or if the requested data rate is higher than the maximum rate available.

In simplified implementations of the device driver, for example using a very limited number of channels, this command, and the related two commands described next, may be omitted, at the expense of some flexibility.

The command is preferably accessed asynchronously, by means of the Device: I/O procedure, a signal indicating completion or failure being passed by means of a parameter block.

Command: Bus 1394 Info Channel

This command is arranged to return information concerning the characteristics of a specified logical channel to an application. The command preferably returns the maximum rate allocated to the channel (in Kbit/s), the rate available via the channel at the moment of the call, the real channel identifier (that is, the one assigned by the interface rather then by the device driver), the number of connections using the channel and the logical identifiers of each connection using the channel.

The command preferably signals an error if the specified channel number is not allocated, in the event of an invalid identifier, in the case of a pending bus reset, or if the interface is not physically connected.

The command is preferably accessed asynchronously, by means of the Device: I/O procedure, a s signal indicating completion or failure being passed by means of a parameter block.

Command: Bus 1394 Free Channel

This command frees a channel for communication by breaking down connections for a logical channel specified as a parameter (but preferably not de-allocating the connection identifiers). The command preferably operates asynchronously and signals that communications are still pending in the selected channel by means of an event.

Command: Bus 1394 Open Connect

This command is arranged to receive a request indicating a logical channel identifier and preferably also a connection type and to initiate a point-to-point connection between two devices or a broadcast in or out connection depending on the connection type specified. Where point-to-point connection is specified, the logical peripheral identifiers of the two peripherals must also be passed to the device driver. Although variants of this command could operate using physical addresses and interface real channel numbers, operation on the basis of logical parameters offers the advantages of simplified application operation mentioned above.

The command returns a logical connection identifier if successful.

Simplified implementations may omit the capability for defined point-to-point connections to the specified; in typical applications, there may only be a single device such as a digital video recorder connected to the bus, so broadcast connections may suffice.

In some implementations of the device driver, opening of a particular connection may also automatically trigger re-routing of other signal paths within the receiver/decoder. For example opening of a broadcast in connection may cause automatic disconnection of the front end from the demultiplexer input, so that the demultiplexer is available to process incoming data received over the IEEE 1394 bus.

This command preferably signals an error when the maximum number of connections is reached, or in the other applicable cases mentioned above in relation to other commands.

The command is preferably accessed asynchronously, by means of the Device: I/O procedure, a signal indicating completion or failure being passed by means of an event.

Command: Bus 1394 Close Connect

This command receives a logical connection identifier and stops communication on that connection, thereafter freeing the connection identifier for re-use.

If signals are automatically re-routed within the receiver/decoder on opening of connections, the device preferably restores the connections to their previous state on closing the connection, or on closing the last relevant connection. For example, the demultiplexer input may be reconnected to the front end on closure of the last broadcast in connection.

The command is preferably accessed asynchronously, by means of the Device: I/O procedure, a signal indicating completion or failure being passed by means of an event.

Command: Bus 1394 List Connect

This command returns a list of active connections, only those involving the decoder itself, available at the time of the call, preferably in the form of a list comprising the number of connections and for each connection a logical connection identifier and a flag indicating the type of connection (point-to-point, broadcast in, broadcast out).

This and/or the command described below may be omitted in simple implementations of the device, if only simple connections are provided. However, provision of such commands enables an application to monitor not only connections which it has itself established, but also to monitor connections established by other applications, if more than one application is able to use the device driver at any one time, and to monitor whether any connections have been unexpectedly closed.

The command is preferably accessed synchronously, by means of the Device: Call procedure, as connections are liable to change frequently and an application may otherwise attempt to control communications based on out-of date information, or else require polling of the response from the device driver.

Command: Bus 1394 Info Connect

This command accepts a logical connection identifier and returns the logical channel number over which the connection is established. The command preferably also returns an indication of the type of connection, and, in the case of a point-to-point connection, returns the logical addresses of the peripherals involved.

As with the List_Connect command, this command is preferably accessed synchronously.

Command: Bus 1394 Reset

This command initiates a bus reset procedure, or returns an error if a bus reset is already pending. The command can be used to enable an application to seize control of the IEEE 1394 bus immediately after a reset, and is preferably accessed synchronously. The device driver preferably signals completion of bus reset by means of an event, discussed further below.

Command: Bus 1394 Send FCP

This command in particular may be omitted or implemented differently. The following description is of an example of an arrangement for sending data asynchronously over the IEEE 1394 bus.

This command receives a parameter block containing a message to be sent asynchronously as a command or response to a peripheral on the IEEE 1394 bus. The parameter block preferably contains an indication of the type of message, the size of buffer that should be allocated for a response, the logical peripheral identifier of the destination peripheral, the length of the message and the message itself.

The command preferably indicates successful sending or reports an error if sending was unsuccessful within a predetermined number of retries or in the applicable cases described above for the Info_Periph command.

Since large amounts of data may potentially be transferred, the command is preferably accessed asynchronously, to allow the application to continue execution while the transistor continues.

Preferably, the command is arranged to broadcast a message to all peripherals if a pre-defined logical peripheral identifier is specified, for example 63.

In simplified implementations of the device driver, this command may be restricted to transmission of messages of fixed length, for example 32 bytes, which is sufficient for transmission of a command to a digital video recorder.

Preferably, the device driver is capable of receiving and transmitting multiple requests quasi-simultaneously, and of reporting multiple responses. However, simplified implementations may only provide capability for single sequential requests.

In addition to the commands, which allow an application to send commands to the device driver, the device driver is arranged to signal events to an application, via the device manager's event handling functions. The device driver implements the following events:—

Ev Bus 1394 Rcv FCP

This event signals reception of an FCP frame from a peripheral, and provides a parameter block containing the source peripheral logical address, the type, length and content of the message.

Ev Bus 1394 Channel

This event signals channel allocation and deallocation, and passes a list signalling which channels are allocated, preferably encoded in binary form as described above in relation to the Info command.

Ev Bus 1394 Config

This event signals peripheral connection or disconnection, and provides a list containing the number of peripherals connected and their logical addresses.

It will be appreciated that changes on the interface relating to this and the previously described Channel event must be monitored by the device driver in order to keep the correspondence table between logical and interface identifiers updated, even if the device driver does not signal such events to an application.

Ev Bus 1394 Connect

This event is used to signal a connection break, and provides a logical identifier to the application of the connection broken, and preferably also a list containing further information concerning the broken connection in similar format to that described above for the Info_Connection command.

Ev Bus 1394 Lo Events

This event may signal one or more low-level interface errors, for example peripherals holding the bus for longer than permitted, data or CRC errors, unexpected transactions, unknown channel numbers or transaction codes and the like. This event is primarily useful for de-bugging and may be omitted in simplified implementations of the device driver.

Ev Bus 1394 Hi Events

This event may signal one or more high-level bus conditions, including at least one (and preferably both) of a bus reset start and finish, and also events such a cable power failure, detection of a loop in the bus, or a fatal error from which the device driver cannot recover by itself after multiple retries.

Ev Bus 1394 Off

As a further event, this event may be used to signal errors internal to the device driver, such as not having a buffer available in which to store a received message.

The above commands and events are merely illustrative, and the invention may be implemented in a variety of ways, and, in particular, some commands may be combined with others which perform similar functions, or some may be omitted in simplified implementations. Hardware and software implementations of each of the functions may be freely mixed, both between commands and within a single command; hardware implementations may operate faster and free up processing power, whereas software implementations may be more readily updated. It will be readily understood that the functions performed by the hardware, the computer software, and such are performed on or using electrical and like signals. Software implementations may be stored in ROM or FLASH, or may be patched in FLASH.

It will be understood that the present invention has been described above purely by way of example, and modifications of detail can be made within the scope of the invention.

Each feature disclosed in the description, and (where appropriate) the claims and drawings may be provided independently or in any appropriate combination.

What is claimed is:

1. A computer-implemented method of communicating data, via a device driver, between an application and an interface having a feature to which an interface identifier is assigned, the method comprising:

storing a logical identifier corresponding to the feature;
providing the logical identifier to the application for directing communication associated with the feature between the device driver and the application; and
maintaining correspondence between the logical identifier and the feature independently of the interface identifier assigned to the feature so that communication between the application and the device driver directed using the logical identifier remains associated with the feature following a change in the assignment of the interface identifier to the feature after an event;
wherein the application, the interface, and the device driver communicate internal to a device; and wherein the communication between the application and the device driver is not effected by changes to the interface identifier.

2. The computer-implemented method according to claim 1, wherein communication between the interface and the device driver is directed based on the interface identifier.

3. The computer-implemented method according to claim 1, including compiling a list of logical identifiers and corresponding interface identifiers for the feature if the feature meets a predetermined criterion.

4. The computer-implemented method according to claim 1, wherein the device driver is arranged to communicate the interface identifier assigned to the logical identifier to the application on request.

5. The computer-implemented method according to claim 1, wherein the device driver is arranged to accept requests from the application to define connections between physical devices to a bus using the logical identifier in place of the interface identifier.

6. The computer-implemented method according to claim 1 wherein the application is arranged to communicate with the device driver via device manager means.

7. The computer-implemented method according to claim 1 wherein the feature of the interface comprises a peripheral connected to the interface and the interface identifier comprises a physical address assigned to the peripheral, the logical identifier comprising a logical address assigned to the peripheral.

8. The computer-implemented method according to claim 7, wherein said maintaining correspondence includes interrogating the peripheral to which the logical address is assigned to determine the physical address assigned to the peripheral following a bus reset.

9. The computer-implemented method according to claim 7, wherein the device driver is arranged to communicate the interface identifier assigned to the logical identifier to the application on request, and further comprising communicating the interface identifier for the peripheral by communicating the physical address of the peripheral and communicating a unique node identifier containing further information identifying the peripheral.

10. The computer-implemented method according to claim 1, wherein the feature of the interface comprises a channel of defined parameters available via the interface and the interface identifier comprises an interface channel number, the logical identifier comprising a logical channel identifier.

11. The computer-implemented method according to claim 10, wherein the device driver is arranged to receive a request from the application to allocate the channel of defined parameters and to return the logical channel identifier if allocation is successful.

12. The computer-implemented method according to claim 10, wherein the device driver is arranged to accept a preferred interface channel number and to allocate a preferred interface channel if available, and to allocate a free channel if the preferred interface channel is not available or if the preferred interface channel is not specified.

13. The computer-implemented method according to claim 10, wherein the device driver is arranged to receive an identifier of a preferred interface channel, to recognize a pre-determined key in place of a valid interface channel number as indicating that the preferred interface channel is not specified, and to report an error to the application if other invalid interface channel numbers are specified.

14. The computer-implemented method according to claim 10, wherein the device driver is arranged to communicate the interface channel number to the application, and at least one other parameter selected from: a maximum rate allocated to the channel; a rate currently available; a number of connections using the channel; and identifiers of each connection using the channel.

15. The computer-implemented method according to claim 1 wherein the device driver is arranged to accept requests from the application to define one or more connections between physical devices attached to the interface by reference to logical addresses and logical channel identifiers.

16. The computer-implemented method according to claim 1 wherein the device driver is arranged to establish at least a broadcast connection.

17. The computer-implemented method according to claim 1 wherein the device driver is arranged to signal the event to the application, the event including reset of a bus or a change in a bus topology or a change in a channel or a change in connection parameters.

18. A device driver executed in a computer system for effecting communication between an application and an interface having a feature to which an interface identifier is assigned, the device driver comprising:
   means for storing a logical identifier corresponding to an interface identifier;
   means for providing the logical identifier to the application for directing communication associated with the feature between the device driver and the application; and
   means for maintaining correspondence between the logical identifier and the feature independently of the interface identifier assigned to the feature so that communication between the application and the device driver directed using the logical identifier remains associated with the feature following a change in the assignment of the interface identifier to the feature after an event;
   wherein the application the interface and the device driver communicate internal to a device; and
   wherein the communication between the application and the device driver is not effected by changes to the interface identifier.

19. The device driver according to claim 18, wherein the device driver is implemented in software.

20. The device driver according to claim 18, wherein the device driver is arranged to compile a list of logical identifiers and corresponding interface identifiers for the feature if the feature meets a predetermined criterion.

21. The device driver according to claim 18 including means for communicating the interface identifier assigned to the logical identifier to the application on request.

22. The device driver according to claim 18, including means for accepting a request from the application to define connections between physical devices connected to a bus using the logical identifier in place of the interface identifier.

23. The device driver according to claim 18, wherein the feature of the interface comprises a peripheral connected to the interface, and the interface identifier comprises a physical address assigned to the peripheral, the logical identifier comprising a logical address assigned to the peripheral.

24. The device driver according to claim 23, arranged to interrogate the peripheral to which the logical address is assigned to determine the physical address assigned to the peripheral following a bus reset.

25. The device driver according to claim 23, including means for communicating the interface identifier assigned to the logical identifier to the application on request, and further comprising means for communicating the interface identifier for the peripheral by communicating the physical address of the peripheral and means for communicating a unique node identifier containing further information identifying the peripheral.

26. The device driver according to claim 18, wherein the feature of the interface comprises a channel of defined parameters available via the interface and the interface identifier comprises an interface channel number, the logical identifier comprising a logical channel identifier.

27. The device driver according to claim 26 including channel allocating means arranged to receive a request from the application to allocate the channel of defined parameters and to return the logical channel identifier if allocation is successful.

28. The device driver according to claim 27, wherein the channel allocating means is arranged to accept a preferred interface channel number and to allocate a preferred interface channel if available, and to allocate a free channel if the preferred interface channel is not available or if the preferred interface channel is not specified.

29. The device driver according to claim 27, wherein the channel allocating means is arranged to receive an identifier of a preferred interface channel, to recognize a pre-determined key in place of a valid interface channel number as indicating that the preferred interface channel is not specified, and to report an error to the application if other invalid interface channel numbers are specified.

30. The device driver according to claim 26, including means for communicating the interface channel number to the application, and at least one other parameter selected from: a maximum rate allocated to the channel; a rate currently available; a number of connections using the channel; and identifiers of each connection using the channel.

31. The device driver according to claim 18 including means arranged to accent requests from the application to define one or more connections between physical devices attached to the interface by reference to logical channel identifiers.

32. The device driver according to claim 18, including means arranged to establish at least a broadcast connection on request by the application.

33. The device driver according to claim 18, including means for signaling the event to the application, the event including reset of a bus and a change in a bus topology or a change in a channel or a change in connection parameters.

34. A data processing system comprising:
run-time engine means for running an application;
interface means for connection to a device, the interface means having a feature to which an interface identifier is assigned; and
device driver means for effecting communication between the application and the interface means,
the device driver means comprising:
means for storing a logical identifier corresponding to an interface identifier;
means for providing the logical identifier to the application for directing communication associated with the feature between the device driver means and the application; and
means for maintaining correspondence between the logical identifier and the feature independently of the interface identifier assigned to the feature so that communication between the application and the device driver means directed using the logical identifier remains associated with the feature following a change in an assignment of the interface to the feature after an event;
wherein the application, the interface, and the device driver communicate internal to a device; and
wherein the communication between the application and the device driver is not effected by changes to the interface identifier.

35. The data processing system according to claim 34 implemented in a receiver/decoder which includes means for receiving broadcast data, the interface means being arranged for connection to a digital video recorder or a digital display device or a computer for display or storage of at least a portion of the received data.

36. The receiver/decoder according to claim 35, wherein the device driver means is arranged to cooperate with further device driver means for modifying the broadcast data to produce a modified data stream for passing to said interface means.

37. The receiver/decoder according to claim 35, wherein the interface means conforms to an IEEE 1394 standard or a variant thereof.

38. The receiver/decoder according to claim 35, wherein the application is run in an interpreted language and the device driver means is compiled.

39. The receiver/decoder according to claim 35, wherein the device driver means is arranged to transmit commands for controlling the digital video recorder from the application and/or to receive data concerning information stored on the digital video recorder.

40. The receiver/decoder according to claim 39, wherein the data is in a MPEG format.

* * * * *